No. 722,310. PATENTED MAR. 10, 1903.
V. LAPP.
APPARATUS FOR PREPARING BRUISED OR GROUND MALT FOR MASHING.
APPLICATION FILED MAY 15, 1901.
NO MODEL.
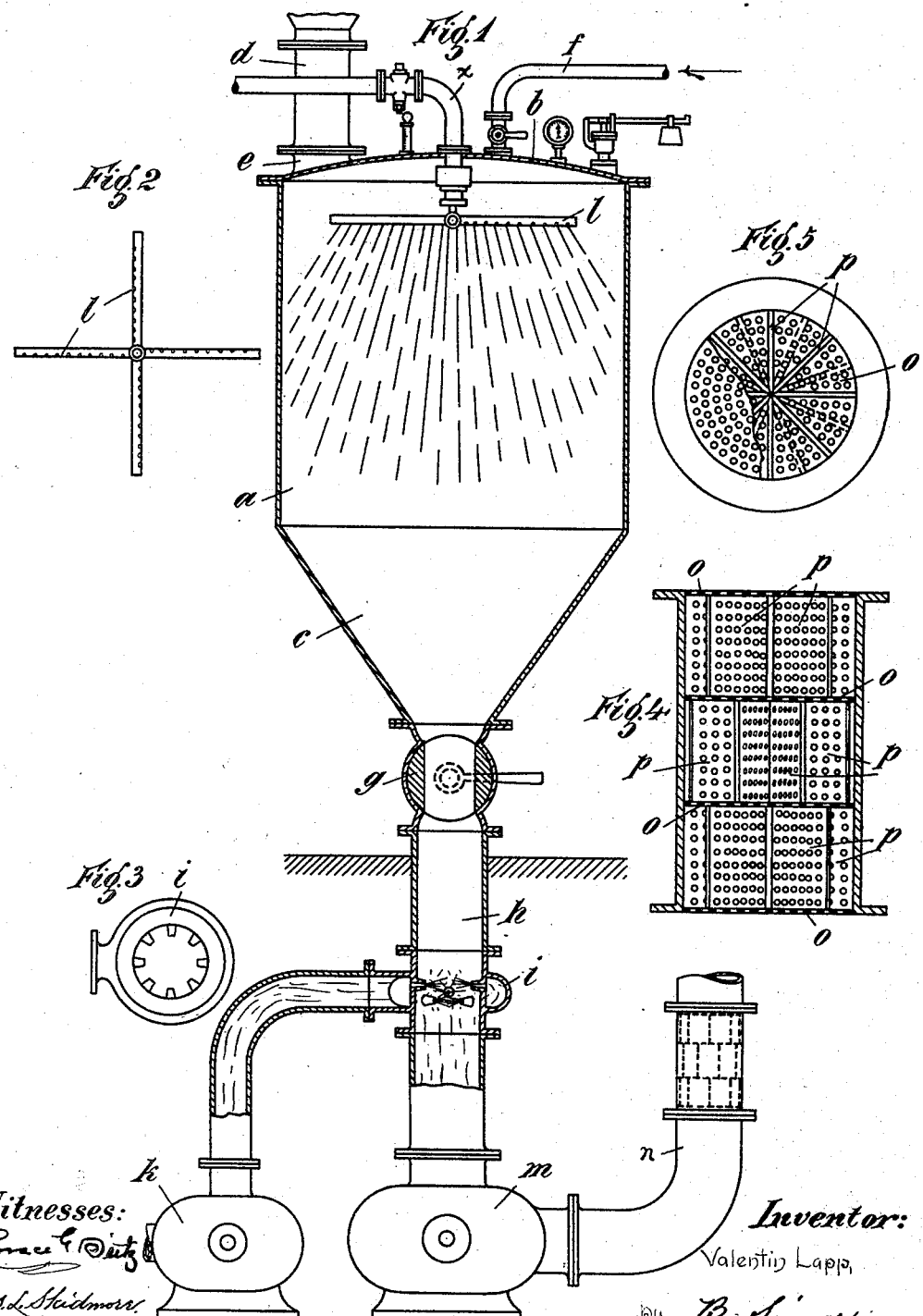
Witnesses:
Inventor:
Valentin Lapp,
by B. Singer
his Attorney.

UNITED STATES PATENT OFFICE.

VALENTIN LAPP, OF LINDENAU, NEAR LEIPZIG, GERMANY.

APPARATUS FOR PREPARING BRUISED OR GROUND MALT FOR MASHING.

SPECIFICATION forming part of Letters Patent No. 722,310, dated March 10, 1903.

Application filed May 15, 1901. Serial No. 60,357. (No model.)

*To all whom it may concern:*

Be it known that I, VALENTIN LAPP, brewer, a subject of the King of Saxony, residing at Lindenau, near Leipzig, in the Kingdom of Saxony, in the German Empire, have invented a new and useful Apparatus for Preparing Bruised or Ground Malt for Mashing, of which the following is a specification.

This invention relates to apparatus for preparing bruised or ground malt for mashing; and it consists in certain combinations and arrangements of parts, as hereinafter fully described, and particularly pointed out in the claim.

In order to clearly describe my improved apparatus, I refer to the accompanying drawings, in which—

Figure 1 is a vertical sectional view through the apparatus. Fig. 2 is a bottom plan view of the rotating spraying device or reaction-pipe. Fig. 3 is a view showing the section carrying the spraying-nozzles. Fig. 4 is a vertical sectional view of the sieve portion; and Fig. 5 is a plan view, with parts broken away, of the parts shown in Fig. 4.

$a$ designates a vessel adapted to receive pulverulent malt and is provided with a cover or lid $b$, preferably vaulted, the lower portion of the vessel being contracted, as at $c$, to form a funnel-shaped bottom, the lower end of said funnel-shaped portion leading to a relatively small diameter pipe $h$, a closing device $g$ controlling the passage of the malt into said pipe.

$e$ designates the inlet for the malt, a connection $d$, leading from the crushing-mill, (not shown,) serving to form a conduit for the malt from the mill to the vessel $a$. The top $b$ is provided with the usual safety-valve, gages, &c., and also carries the outlet end of a valved pipe $f$, adapted to lead compressed air into the vessel $a$ when the cock or valve is open. The top $b$ also carries an inlet-pipe $x$ for compressed air, the inner end of which extends within the vessel $a$ and has its inner end provided with a spraying device of suitable form, that shown in the drawings and designated as $l$ being of the form commonly known as a "Barker's mill," in which the compressed air passing through openings in the side of a series of radial pipes causes the whole to revolve on a pivot, thus forming a rotating spray.

Located within the pipe $h$ are a series of inwardly-extending nozzles $i$, these nozzles being arranged to discharge water under high pressure from a pump $k$ radially into the pipe $h$, said pipe, being of small diameter, permitting the jets issuing from said nozzles to cross each other, and thereby penetrating and disintegrating the malt as it passes through the pipe $h$.

$m$ designates a high-speed pump, which in connection with the compressed air provided through the pipe $f$ forces the malt from the vessel $a$ into the pipe $h$ and through the jets from the nozzles $i$ into a pipe $n$, leading to the mash-tub. Within the pipe $n$ are located a number of perforated plates or sieves, preferably arranged as shown in Figs. 4 and 5, in which $o$ designates a series of spaced horizontal perforated plates, between which are located vertically-extending plates $p$, the latter extending radially, as shown.

The pulverulent malt is led into the vessel $a$ through the connection $d$ and $e$, the device $g$ being closed, as are also the pipes $f$ and $x$. The vessel having received the required quantity of malt, the connection between the pipes $d$ and $e$ is interrupted and the valve of the pipe $f$ opened, allowing the compressed air to enter. The device $g$ being now opened, the malt within the vessel, under the combined action of the compressed air and the pump $m$, is forced into the small-diameter pipe $h$, compressed air being at the same time permitted to enter through the pipe $x$ and causing a spraying effect on the walls of the vessel to cleanse the latter and insure the passage of all of the malt from the vessel into the pipe $h$. As the malt passes through the pipe $h$ it encounters the high-pressure jets from the nozzles $i$, (the latter having small orifices to insure the formation of a high pressure,) said jets penetrating through and through the mass, the crossing of the jets causing the malt to be thoroughly permeated and breaking up practically all lumps, &c., which might be present in the malt. Under the combined action of the pump and the compressed air any tendency of the malt to become choked in the pipe by the action of the jets is prevented. After the malt has passed the jets it is forced into the pipe $n$ and through the series of sieves, passing into the mash-tub entirely free from any clods or lumps.

As will be readily understood, the entire operation of preparing the malt takes place under pressure within closed spaces, within which every portion of the malt-meal has been drenched and mixed with water, at the same time reducing all lumps or clods which may be present initially. There is no change in the malt-meal during the operation, such as would result from the presence of heat, &c., nor is there produced any result in which there is a saccharification of the diastese.

Having now described my invention, what I desire to secure by Letters Patent of the United States is—

In an apparatus for mashing pulverulent malt, the combination with a vessel adapted to receive the pulverulent malt and having an outlet-pipe therefrom of relatively small diameter; of means for normally leading compressed air into the upper portion of said vessel to force the malt therefrom; an auxiliary device, operated by compressed air, for clearing the vessel of the malt; nozzles, having relatively small orifices, extending radially into said outlet-pipe; means for feeding said nozzles with water to form radial high-pressure jets; a pump connected with the free end of said outlet-pipe, whereby the mash is moved under the action of a pressure and suction; a pipe leading the mash from said pump; and a series of sieves located in the last-mentioned pipe.

In witness whereof I have hereunto set my hand in presence of two witnesses.

VALENTIN LAPP.

Witnesses:
CARL ANDREAS OTTO NAUMANN,
RUDOLPH FRICKE.